United States Patent [19]

Carlisle et al.

[11] Patent Number: 4,722,061
[45] Date of Patent: Jan. 26, 1988

[54] ESTABLISHING SYNTHESIS VALIDITY BETWEEN TWO SIGNAL SOURCES

[75] Inventors: Larry B. Carlisle, Vernon; Wayne R. Spock, Canton, both of Conn.

[73] Assignee: United Technologies Corporation, Hartford, Conn.

[21] Appl. No.: 683,905

[22] Filed: Dec. 20, 1984

[51] Int. Cl.$^4$ .......................... G05B 9/03; G06F 15/46
[52] U.S. Cl. ..................................... 364/494; 218/564; 364/187
[58] Field of Search ............... 364/492, 494, 187; 371/8, 9, 25, 68; 318/564, 565; 290/40 R, 40 A

[56] References Cited

U.S. PATENT DOCUMENTS

| | | | |
|---|---|---|---|
| 4,032,757 | 6/1977 | Eccles | 318/564 |
| 4,209,734 | 6/1980 | Osden | 318/564 |
| 4,327,437 | 4/1982 | Gelderloos | 318/564 |
| 4,437,154 | 3/1984 | Eisele et al. | 364/187 |
| 4,494,207 | 1/1985 | Chang et al. | 364/494 |

FOREIGN PATENT DOCUMENTS

| | | |
|---|---|---|
| 1560554 | 2/1980 | United Kingdom . |
| 2030302 | 4/1980 | United Kingdom . |
| 1574835 | 9/1980 | United Kingdom . |
| 1597318 | 9/1981 | United Kingdom . |

Primary Examiner—Parshotam S. Lall
Attorney, Agent, or Firm—Gerald E. Linden

[57] ABSTRACT

In an electronic engine control (EEC) for a turbine engine, a high rotor speed signal (N2SYNTH) is synthesized from a sensed low rotor speed signal (N1) in a primary control channel (32) so long as the low rotor speed signal is healthy. If the low rotor speed signal (N1) is not healthy, the primary channel is reconfigured (FIG. 3) so that a low rotor speed signal (N1SYNTH) is synthesized from a sensed high rotor speed signal (N2).

A secondary control channel 34 provides standby signals for use in the EEC and performs similar logic as in the primary channel, except that signal synthesis (N2 from N1 and vice-versa) is dependent upon N2 health. When the high rotor speed signal (N2) is healthy, a low rotor speed signal (N1SYNTH) is synthesized from a sensed high rotor speed signal (N2). When the high rotor speed signal (N2) is not healthy, a high rotor speed signal (N2SYNTH) is synthesized from a sensed low rotor speed signal (N1).

For each of the low and high rotor speeds, redundant signals (N1A, N1B and N2A, N2B, respectively) are available. Primary sensors (10A, 24A) for low and high rotor speeds (N1A, N2A) serve the primary channel, secondary sensors (10B, 24B) for low and high rotor speeds (N2A, N2B) serve the secondary channel, and cross-channel communication is via a link (39).

3 Claims, 4 Drawing Figures

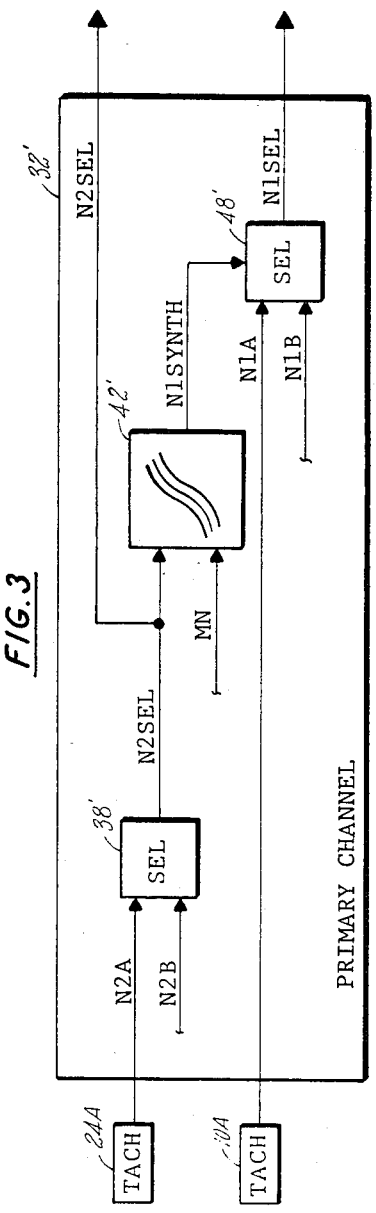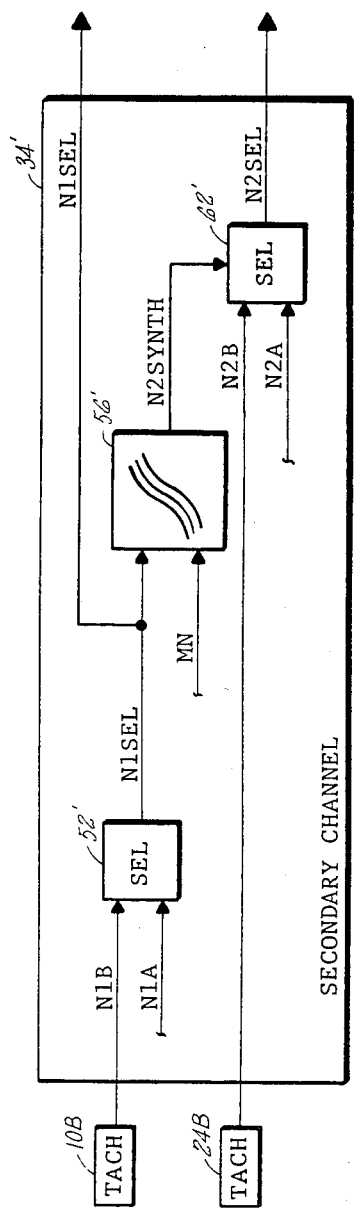

ESTABLISHING SYNTHESIS VALIDITY BETWEEN TWO SIGNAL SOURCES

DESCRIPTION

1. Technical of the Invention

The invention relates to cross-checks and synthesis of parameter indicating signals, especially as applied to turbine engines.

2. Background of the Invention

The apparent consequence of a sensor which is no longer operating within its operating envelope in an engine control is failure or shutdown of the engine. Obviously, such a consequence is to be avoided if at all possible. It is known to increase the failure tolerance of electronic engine controls by synthesizing many of the sensed engine parameters upon the failure of their associated sensors.

In duplex systems, wherein two independent signals indicate the same parameter, a referee, or third signal, is required to break ties for determining failures or fault signals. It is convenient to use a synthesized signal as the referee. Consider, however, the situation wherein the referee for a first set of signals is synthesized from a second set of signals, and vice-versa. This results in a cycle that must be broken so that errors do not propagate throughout the system.

DISCLOSURE OF THE INVENTION

Therefore, it is an object of this invention to provide a technique for establishing a signal synthesis path that is noncyclic in nature (as described above) and also minimizes the probability of propagating an erroneous input signal to the downstream logic which controls the outputs to the gas turbine engine.

According to the invention, in an electronic engine control (EEC) for a turbine engine, a high rotor speed signal (N2SYNTH) is synthesized from a sensed low rotor speed signal (N1) in a primary control channel so long as the low rotor speed signal is healthy. If the low rotor speed signal (N1) is not healthy, the primary channel is reconfigured so that a low rotor speed signal (N1SYNTH) is synthesized from a sensed high rotor speed signal (N2). A secondary control channel 34 provides standby signals for use in the EEC and performs similar logic as in the primary channel, except that signal synthesis (N2 from N1 and vice-versa) is dependent upon N2 health. When the high rotor speed signal (N2) is healthy, a low rotor speed signal (N1SYNTH) is synthesized from a sensed high rotor speed signal (N2). When the high rotor speed signal (N2) is not healthy, a high rotor speed signal (N2SYNTH) is synthesized from a sensed low rotor speed signal (N1).

For each of the low and high rotor speeds, redundant signals (N1A, N1B and N2A, N2B, respectively) are available. Primary sensors for low and high rotor speeds (N1A, N2A) serve the primary channel, secondary sensors for low and high rotor speeds (N2A, N2B) serve the secondary channel, and cross-channel communication is via a link.

Other objects, features and advantages of the invention will be apparent in light of the following description thereof.

BRIEF DESCRIPTION OF THE DRAWINGS

FIG. 3 is a block diagram showing the logic for the invention when N1 is not healthy; and FIG. 4 is a block diagram showing the logic for the invention when N2 is not healthy.

BEST MODE FOR CARRYING OUT THE INVENTION

Figure 1:
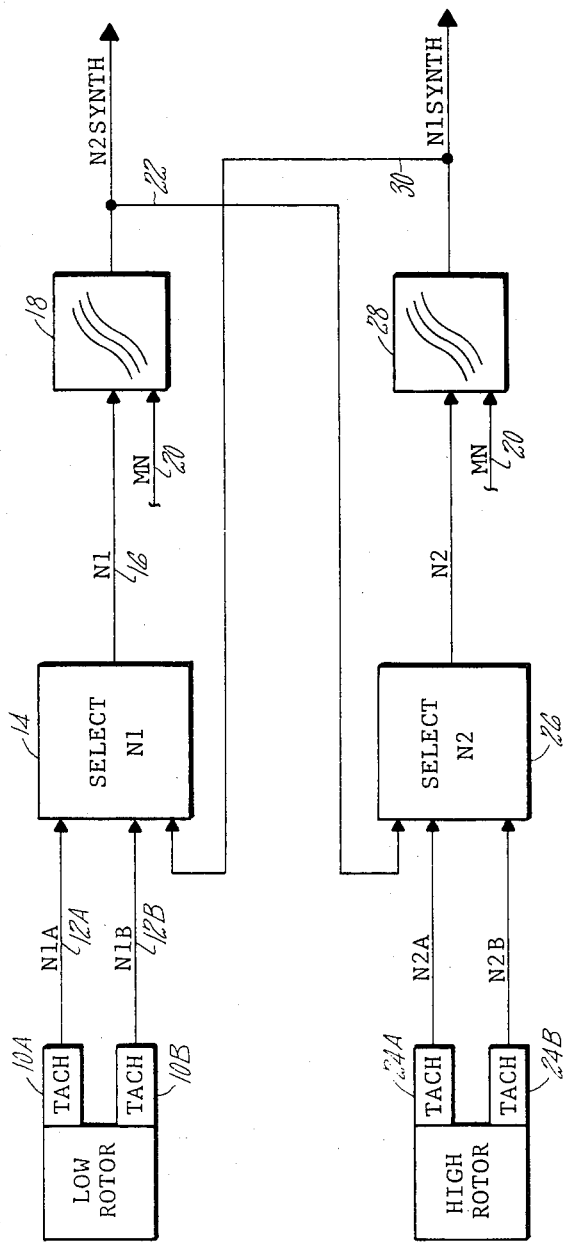
FIG. 1 is a block diagram showing the environment for the invention.

FIG. 1 shows a system for synthesizing one parameter from another, and vice-versa. It should be understood that the invention is not limited to any specific environment, such as electronic engine controls for turbine engines, but that it is particularly well-suited and described with respect thereto.

Tachometers 10A, 10B, of any suitable design, provide redundant signals N1A, N1B on lines 12A, 12B, respectively, indicative of the low rotor speed in a turbine engine, such as the Pratt and Whitney PW2037. A circuit 14 is responsive to the signals N1A, N1B and throughputs the "best" of the two signals as a signal N1 on a line 16 based on known techniques for establishing signal veracity, such as by assigning "health points" thereto. The health points are related to ranges and rates for the sensed parameters and are characteristic for the particular engine, and are discussed in greater detail with respect to the TABLE which follows.

A function generator 18 is responsive to the signal N1 on the line 16, and also to a signal MN on a line 20 indicative of the mach number of the engine, to provide a signal N2SYNTH on a line 22 indicative of what the high rotor speed signal N2 for the turbine ought to be, based on known thermodynamic relationships between high and low rotor speeds.

A similar process occurs with respect to the redundant signals N2A, N2B provided by tachometers 24A, 24B, indicative of the high rotor speed in the turbine engine. A circuit 26 selects the best value for high rotor speed N2 which is synthesized by function circuit 28 to provide a signal N1SYNTH on a line 30 indicative of what the low rotor speed signal N1 ought to be.

The synthesized low rotor speed signal N1SYNTH is also provided to the circuit 14 to establish a range within which the signals N1A and N1B must fall. Similarly, the synthesized high rotor speed signal N2SYNTH is provided to the circuit 26 to establish a range within which the signals N2A and N2B must fall. The problem with such a scheme is that a failure in the two signals indicative of one parameter, for instance N1A and N1B, can propagate through the system and affect the other parameter. This tends to offset the benefits of synthesis and redundancy.

Figure 2:
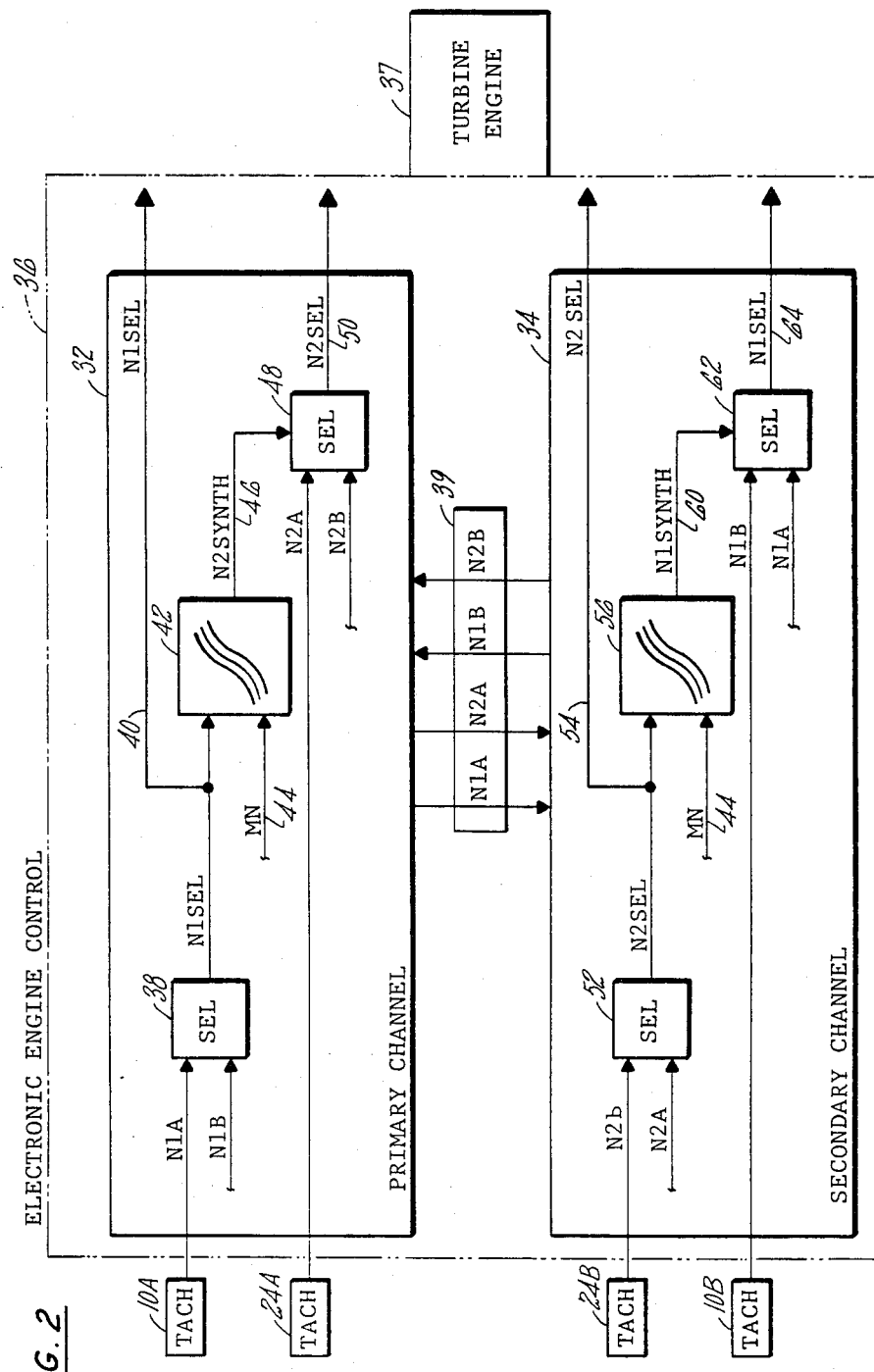
FIG. 2 is a block diagram showing the logic for the invention when both N1 and N2 are healthy.

FIGS. 2, 3 and 4 show logic in hardware blocks, which are readily transcribed into software instructions, for overcoming the limitations described with reference to FIG. 1. Through known techniques, it is determined whether the signals N1A, N1B, N2A, and N2B are "healthy"; in other words, within range and rate limits characteristic of the engine and in agreement with their redundant counterparts.

The logic of FIG. 2 is divided into two channels, a primary channel 32 and a secondary channel 34, and is implemented when N1A is healthy and has no indicated faults, and is in agreement with N1B; and if N2A and N2B are similarly healthy. Tachometers 10A, 10B, 24A, 24B, as described hereinbefore, provide primary signals N1A, N2A to the primary channel 32 and provide secondary signals N2A, N2B to the secondary channel.

Under normal operating conditions, the primary channel 32 is in control in an electronic engine control (EEC) 36 that controls a turbine engine 37, responsive to the outputs of the primary channel 32, and the secondary channel is in "standby". In other words, the outputs of the secondary channel are used only in the event of failure (and shutdown) of the primary channel.

In the primary channel 32, a circuit 38, is responsive to the primary low rotor speed signal N1A in the primary channel and to the secondary low rotor speed signal N1B from the secondary channel via a cross channel link 39, and throughputs the best of the low rotor speed signals as a selected low rotor speed signal N1SEL on a line 40 as an output signal for use in the EEC and to a function generator 42. The function generator 42 is also responsive to mach number on a line 44 to provide a synthesized high rotor speed signal N2SYNTH on a line 46, much as described with reference to FIG. 1. A circuit 48 is responsive to the synthesized high rotor speed signal N2SYNTH, to the primary high rotor speed signal N2A, and to the secondary high rotor speed signal N2B via the cross channel link, and throughputs the best value for high rotor speed to a line 50 as a selected high rotor speed signal N2SEL as an output for use, in conjunction with the output signal N1SEL on the line 40, in the EEC 36. If N2A agrees with N2B and N2SYNTH, it is throughput by the circuit 52. If N2A and N2B disagree with each other, but one agrees with N2SYNTH, the agreeing signal is throughput. If N2A and N2B agree, but disagree with N2SYNTH, N2SYNTH is throughput.

In a similar manner, in the secondary channel 34, a circuit 52 is responsive to the secondary high rotor speed signal N2B in the secondary channel and to the primary high rotor speed signal N2A from the primary channel via the cross channel link, and throughputs the best of the high rotor speed signals N2A, N2B as a selected high rotor speed signal N2SEL on a line 54 as an output for standby use in the EEC. A function generator 56 is also responsive to the N2SEL signal on the line 54 and to the mach number signal on the line 44 to provide a synthesized low rotor speed signal N1SYNTH on a line 60. A circuit 62 is responsive to the synthesized low rotor speed signal N1SYNTH, to the secondary low rotor speed signal N1B and to the primary low rotor speed signal N1A via the cross channel link, and throughputs the best value for the low rotor speed to a line 64 as the selected low rotor speed signal N1SEL as an output for standby use in the EEC according to analogous conditions as described with respect to the circuit 48 in the primary channel 32. It is readily observable that the logic performed in the secondary channel 34 is essentially identical to the logic performed in the primary channel 32, with N1 exchanged for N2 and vice-versa.

N2 synthesis from N1 was chosen for the healthy mode in the primary channel because N1 provides more accurate synthesis with less engine variability than the N2 signal. To do the opposite is obvious in light of this invention, but is not preferred. In either case doing the opposite synthesis in the secondary channel increases fault tolerance.

FIG. 3 shows a reconfiguration of the primary channel logic, which is implemented when N1A has out of range or high rate indications, or does not agree with N1B; in other words, when N1 is not healthy. It may be noted at a glance that FIG. 3 closely resembles the secondary channel 34 of FIG. 2. This is because for N1 problems, N2 is exchanged for N1 in the primary channel.

In the reconfigured primary channel logic 32' of FIG. 3, the circuit 38' throughputs the selected high rotor speed signal N2SEL as an output in the EEC and to the function generator 42'. The function generator 42' synthesizes a low rotor speed signal N1SYNTH based on mach number MN and N2SEL. N1SYNTH serves as a referee for the circuit 48' to select the best of the low rotor speed. Signals N1A, N1B, outputting the winner as the selected low rotor speed signal N1SEL.

Problems with N2 are responded to in the secondary channel 34 which is reconfigured as shown in FIG. 4 when N2A has range or rate problems, or does not agree with N2B. As was the case with N1 health problems, the reconfiguration results in the same logical blocks, but with N1 exchanged for N2, and vice-versa.

The following TABLE is exemplary of how "health points" may be assigned to the signals N1 and N2. The techniques for implementing the health checks are well-known and germane to the invention only to the extent that they relate to what is done with healthy and unhealthy signals so that veracity is maximized (in the case of healthy signals) and error propagation is minimized (in the case of unhealthy signals).

TABLE

| N1A | N1B | N1A≈N1B | N1 "HEALTH" POINTS |
| --- | --- | --- | --- |
| OK | OK | OK | 1 |
| OK | FAILED | — | 2 |
| FAILED | OK | — | 4 |
| OK | OK | FAILED | 8 |
| FAILED | FAILED | — | 16 |

| N2A | N2B | N2A≈N2B | N2 "HEALTH" POINTS |
| --- | --- | --- | --- |
| OK | OK | OK | 1 |
| OK | FAILED | — | 2 |
| FAILED | OK | — | 4 |
| OK | OK | FAILED | 8 |
| FAILED | FAILED | — | 16 |

If the N1 signal is at least as healthy as the N2 signal (based on having equal or fewer health points), the logic of FIG. 2 is performed; in other words, N2 is synthesized from N1 in the primary channel 32.

If the N1 signal is not as healthy as the N2 signal (based on having more health points), the logic of FIG. 3 is performed; in other words, N1 is synthesized from N2 in the primary channel.

Problems with N2 health are dealt with in the secondary channel 34, the outputs of which are held in a standby state until the primary channel fails.

If the total health points for the N1 and N2 signals are at least twenty-four, the channels are declared incapable.

As is evident from the TABLE, both speed signals are range tested, rate tested, and are compared with their crosstalk counterparts. The results of these tests are used to determine which speed, N1 or N2, is more likely to be correct. The speed most likely to be correct is used to synthesize the other speed. The synthesized speed is used to validate the speed which was less likely to be correct.

ACTUAL ENGINE CONSIDERATIONS

As applied to an electronic engine control (EEC) for a turbine engine such as the PW2037, the following conditions are of concern:

(a) Fault tests of the N1 and N2 signals may be temporarily inhibited during engine start so that the EEC may power up prior to receipt of those signals.

(b) The EEC may power up below the lowest N2 speed which can be read.

(c) It is normal for N1 speed to be below the lowest readable value during the initial portion of engine starting.

(d) It is not unusual for the low rotor to be rotating backwards due to airfield tailwinds at the time of engine starting. It will slow down and reverse direction during the start.

(e) Engine starting and operation should be possible without a measurement of N1. Synthesized N1 is not valid or defined in the start region. An assumed constant N1 is adequate to start the engine. In addition, the logic must prevent speed failure indications during externally powered functional tests.

(f) Engine starting under certain conditions is possible without an N2 signal. A synthesized N2 signal should be adequate for operation in the starting region as long as a valid N1 signal is available. These conditions are only encountered at altitude.

FIG. 2 shows how N2 is synthesized from N1 and how this synthesis is used to validate the N2 measurements. The synthesis of N2 is somewhat different from the synthesis of N1, and this is due to the requirement under certain conditions to start the engine with no measured N2 signals, either local or crosstalk. For ground starting of the engine, at least one valid N2 signal must be available. Mach number and a windmill condition indicator are used in combination to determine if a ground start condition exists or a windmill/altitude condition exists. If N1C2 (N1 compensated for temperature) is below the windmill curve value and Mach number is less than or equal to a mach number constant above which windmilling is valid (KMNWND), then N2 synthesis is declared invalid. If Mach number is greater than KMNWND and windmilling is indicated, N2 synthesis is not declared invalid if both N2 signals are not valid. The tolerance between measured and synthesized N2 is also increased under these conditions to prevent soft-failing an N2 signal prior to it becoming valid. Once the engine becomes lit and accelerates above the windmill curve, the tolerance is reduced and the logic of FIGS. 2, 3, and 4 (not all at once, of course) is implemented. The other conditions which also make N2 synthesis invalid are any of the following:

No valid altitude is available
No valid total pressure is available
No valid temperature indication for compensating N1 is available.

It should be understood that the invention has been described with respect to a preferred embodiment thereof and that changes and additions thereto may be made without departing from the spirit or scope of the invention.

What is claimed is:

1. A method of synthesizing signals, comprising:
   providing a first signal (N1) indicative of and in response to a sensed first parameter;
   providing a second signal (N2) indicative of and in response to a second parameter related to the first parameter;
   monitoring the veracity of the first signal and the second signal;
   providing a first synthesized signal (N1SYNTH) if the veracity of the first signal is less than the veracity of the second signal;
   providing a second synthesized signal (N2SYNTH) if the veracity of the first signal has at least the veracity of the second signal.

2. A method according to claim 1 wherein the first and second signals are indicative of the low and high rotor speeds in a turbine engine, respectively.

3. A method for controlling a turbine engine based on the low rotor speed and the high rotor speed, comprising:
   providing primary low and high rotor speed signals (N1A, N2A) in a primary control channel (32);
   providing secondary low and high rotor speed signals (N1B, N2B) in a secondary control channel (34);
   communicating the primary low and high rotor speed signals to the secondary channel;
   communicating the secondary low and high rotor speed signals to the primary channel;
   measuring the veracity of the primary and secondary low and high turbine speed signals;
   in the case of greater veracity in the low rotor speed signals (N1A, N1B) than in the high rotor speed signals (N2A, N2B):
   (a) in the primary channel, providing a first selected low rotor speed signal (N1SEL), for use in controlling the engine, indicative of which of the primary and secondary low rotor speed signals (N1A, N1B) has higher veracity; providing a synthesized high rotor speed signal (N2SYNTH) as a function of the first selected low rotor speed signal (N1SEL) and known relationships between high and low rotor speeds in the engine; and providing a first selected high rotor speed signal (N2SEL), for use in controlling the engine, indicative of which of the synthesized high rotor speed signal (N2SYNTH), the primary high rotor speed signal (N2A), and the secondary high rotor speed signal (N2B) has the highest veracity; and
   (b) in the secondary channel, providing a second selected high rotor speed signal (N2SEL), for use in controlling the engine, indicative of which of the primary and secondary high rotor speed signals (N2A, N2B) has higher veracity; providing a synthesized low rotor speed signal (N1SYNTH) as a function of the second selected high rotor speed signal (N2SEL) and known relationships between high and low rotor speeds in the engine; and providing a second selected low rotor speed signal (N1SEL), for use in controlling the engine, indicative of which of the synthesized low rotor speed signal (N1SYNTH), the primary low rotor speed signal (N1A), and the secondary low rotor speed signal (N1B) has the highest veracity; and
   in the case of greater veracity in the high rotor speed signals (N2A, N2B) than in the low rotor speed signals (N1A, N1B):
   (a) in the primary channel, providing a first selected high rotor speed signal (N2SEL), for use in controlling the engine, indicative of which of the primary and secondary high rotor speed signals (N2A, N2B) has higher veracity; providing a synthesized low rotor speed signal (N1SYNTH) as a function of the first selected high rotor speed signal (N2SEL) and known relationships between high and low rotor speeds in the engine; and providing a first selected low rotor speed signal (N12SEL), for use in controlling the engine, indicative of which of the synthesized low rotor speed signal (N1SYNTH), the primary low rotor speed signal (N1A), and the secondary low rotor speed signal (N1B) has the highest veracity; and (b) in the secondary channel, providing a second selected low rotor speed signal (N1SEL), for use in controlling the engine, indicative of which of the primary and secondary low rotor speed signals (N1A, N1B) has higher veracity; providing a synthesized high rotor speed signal (N2SYNTH) as a function of the second selected low rotor speed signal (N1SEL) and known relationships between high and low rotor speeds in the engine; and providing a second selected high rotor speed signal (N2SEL), for use in controlling the engine, indicative of which of the synthesized high rotor speed signal (N2SYNTH), the primary high rotor speed signal (N2A), and the secondary high rotor speed signal (N2B) has the highest veracity.

* * * * *

UNITED STATES PATENT AND TRADEMARK OFFICE
CERTIFICATE OF CORRECTION

PATENT NO. : 4,722,061

DATED : January 26, 1988

INVENTOR(S) : Larry B. Carlisle and Wayne R. Spock

It is certified that error appears in the above-indentified patent and that said Letters Patent is hereby corrected as shown below:

In Claim 3, Col. 6, line 68 "(N12SEL)" should read --- (N1SEL).

In Claim 3, the entire first paragraph (b) commencing at line 41, col. 6, is replaced by the *entire* second paragraph (b) commencing at line 6, col. 7; and the entire second paragraph (b) commencing at line 6, col. 7, is replaced by the *entire* first paragraph (b) commencing at line 41, col. 6.

Accordingly, corrected Claim 3 reads:

--- 3. A method for controlling a turbine engine based on the low rotor speed, comprising:
providing primary low and high rotor speed signals (N1A, N2A) in a primary control channel (32);
providing primary low and high rotor speed signals (N1B, N2B) in a secondary control channel (34);
communicating the primary low and high rotor speed signals to the secondary channel;
communicating the secondary low and high rotor speed signals to the primary channel;
measuring the veracity of the primary and secondary low and high turbine speed signals;
in the case of greater veracity in the low rotor speed signals (N1A), N1B) than in the high rotor speed signals (N2A, N2B);

UNITED STATES PATENT AND TRADEMARK OFFICE
CERTIFICATE OF CORRECTION

PATENT NO. : 4,722,061

DATED : January 26, 1988

INVENTOR(S) : Larry B. Carlisle and Wayne R. Spock

It is certified that error appears in the above-indentified patent and that said Letters Patent is hereby corrected as shown below:

(a) in the primary channel, providing a first selected low rotor speed signal (N1SEL), for use in controlling the engine, indicative of which of the primary and secondary low rotor speed signals (N1A, N1B) has higher veracity; providing a synthesized high rotor speed signal (N2SYNTH) as a function of the first selected low rotor speed signal (N1SEL) and known relationships between high and low rotor speeds in the engine; and providing a first selected high rotor speed signal (N2SEL), for use in controlling the engine, indicative of which of the synthesized high rotor speed signal (N2SYNTH), the primary high rotor speed signal (N2A), and the secondary high rotor speed signal (N2B) has the highest veracity;, and (b) in the secondary channel, providing a second selected low rotor speed signal (N1SEL), for use in controlling the engine, indicative of which of the primary and secondary low rotor speed signals (N1A, N1B) has higher veracity;

UNITED STATES PATENT AND TRADEMARK OFFICE
CERTIFICATE OF CORRECTION

PATENT NO. : 4,722,061
DATED : January 26, 1988
INVENTOR(S) : Larry B. Carlisle and Wayne R. Spock It is certified that error appears in the above-indentified patent and that said Letters Patent is hereby corrected as shown below:

providing a synthesized high rotor speed signal (N2SYNTH) as a function of the second selected low rotor speed signal (N1SEL) and known relationships between high and low rotor speeds in the engine; and providing a second selected high rotor speed signal (N2SEL), for use in controlling the engine, indicative of which of the synthesized high rotor speed signal (N2SYNTH), the primary high rotor speed signal (N2A), and the secondary high rotor speed signal (N2B) has the highest veracity; and in the case of greater veracity in the high rotor speed signals (N2A, N2B) than in the low rotor speed signals (N1A, N1B):

(a)  in the primary channel, providing a first selected high rotor speed signal (N2SEL), for use in controlling the engine, indicative of which of the primary and secondary low rotor speed signals (N2A, N2B) has higher veracity; providing a synthesized high rotor speed signal (N1SYNTH) as a function of the first selected low rotor speed signal (N2SEL) and known relationships between high and low rotor speeds in the engine;

UNITED STATES PATENT AND TRADEMARK OFFICE
CERTIFICATE OF CORRECTION

PATENT NO. : 4,722,061  Page 4 of 5
DATED : January 26, 1988
INVENTOR(S) : Larry B. Carlisle and Wayne R. Spock It is certified that error appears in the above-indentified patent and that said Letters Patent is hereby corrected as shown below:

and providing a first selected low rotor speed signal (N1SEL), for use in controlling the engine, indicative of which of the synthesized low rotor speed signal (N1SYNTH), the primary low rotor speed signal (N1A), and the secondary low rotor speed signal (N1B) has the highest veracity;, and (b) in the secondary channel, providing a second selected high rotor speed signal (N2SEL), for use in controlling the engine, indicative of which of the primary and secondary high rotor speed signals (N2A, N2B) has higher veracity; providing a synthesized low rotor speed signal (N1SYNTH) as a function of the second selected high rotor speed signal (N2SEL) and known relationships between high and low rotor speeds in the engine; and providing a second selected low rotor speed signal (N1SEL), for use in controlling the engine, indicative of which of the synthesized low rotor speed signal (N1SYNTH), the primary low rotor speed signal (N1A), and the secondary

UNITED STATES PATENT AND TRADEMARK OFFICE
CERTIFICATE OF CORRECTION

PATENT NO. : 4,722,061  Page 5 of 5
DATED : January 26, 1988
INVENTOR(S) : Larry B. Carlisle and Wayne R. Spock It is certified that error appears in the above-indentified patent and that said Letters Patent is hereby corrected as shown below:

low rotor speed signal (N1B) has the highest veracity.----

Signed and Sealed this

Sixteenth Day of September, 1997

Attest:

BRUCE LEHMAN

Attesting Officer  Commissioner of Patents and Trademarks